April 14, 1936.  V. A. ROHLIN ET AL  2,037,541
CONTROL VALVE
Filed May 24, 1932
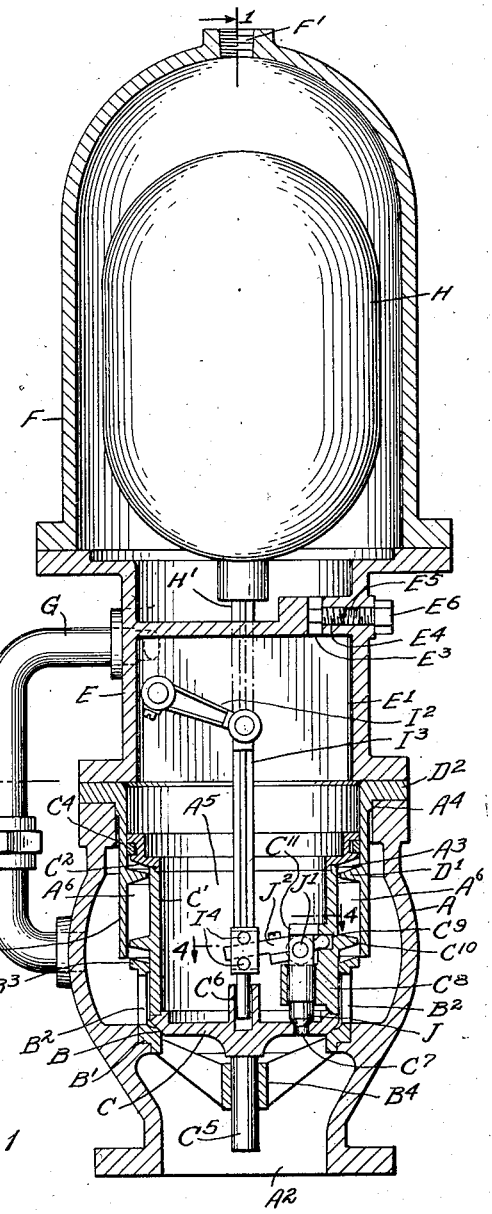
INVENTORS
VICTOR A. ROHLIN
and FRANKLIN M. PATTERSON
BY John E. Hubbell
ATTORNEY.

Patented Apr. 14, 1936

2,037,541

UNITED STATES PATENT OFFICE 2,037,541

CONTROL VALVE

Victor A. Rohlin, Philadelphia, Pa., and Franklin M. Patterson, Pitman, N. J., assignors to Cochrane Corporation, Philadelphia, Pa., a corporation of Pennsylvania Application May 24, 1932, Serial No. 613,212

5 Claims. (Cl. 137—103)

The general object of our present invention is to improve valves of the known type comprising a movable valve member controlling fluid flow and fluid pressure means including a pilot valve for effecting adjustments of said valve member.

A main specific object of the present invention is to provide simple and effective means for minimizing or eliminating a tendency to valve chatter heretofore experienced in valves of the above described type when the liquid controlled and utilized in the fluid pressure operating means is heated, so that some of it tends to flash into steam or vapor in the fluid pressure operating means on a reduction in the fluid pressure therein incident to the operation of said means. In the preferred mode of attaining the last mentioned object of our invention we combine with the fluid pressure operating means proper, dash pot provisions whereby liquid is held in leaky chambers or spaces one or another of which must contract to accommodate valve movement in either direction. With such dashpot provisions the movements of the valve member are so slowed down as to practically eliminate all chatter tendency.

Further and more specific objects of the present invention are to provide improvements in the construction and arrangement of a float controlled valve which is of the general type specified and was especially devised, and is especially adapted for use in regulating the overflow from an open water heater, and under analogous conditions.

The various features of novelty which characterize our invention are pointed out with particularity in the claims annexed to and forming a part of this specification. For a better understanding of the invention, however, and the advantages possessed by it reference should be had to the accompanying drawing and descriptive matter in which we have illustrated and described a preferred embodiment of the invention.

Of the drawing:

Fig. 1 is an elevation partly broken away and in section on the line 1—1 of Fig. 2;

Fig. 2 is a section on the line 2—2 of Fig. 1;

Fig. 3 is a partial section on the line 3—3 of Fig. 1;

Fig. 4 is a partial section on the line 4—4 of Fig. 2; and

Fig. 5 is a section on the line 5—5 of Fig. 1.

The valve mechanism shown in the drawing comprises a valve body A formed with an inlet chamber A′, and with an outlet chamber $A^2$ communicating with the inlet chamber through a port provided at its margin with a valve seat B. A valve member C engages the seat B to close said port, and moves upward from its seat into the inlet chamber A to open the port. The valve member C forms the bottom of a cup shaped valve and piston member, comprising a sleeve or hollow cylinder C′ above the valve member C and below an outwardly extending flange or piston portion $C^2$. The parts C, C′, $C^2$ of the valve and piston member are advantageously separately formed and secured together by suitable connections, not shown. The flange or piston portion $C^2$ is slidingly received in a hollow cylinder D, and, as shown, is provided with a packing $C^4$ to restrict leakage between the periphery of the flange $C^2$ and the cylinder D. The flange $C^2$ forms the upper movable or piston wall of a piston chamber $A^3$, the inner and outer side walls of which are formed by the sleeve C′ and cylinder D, respectively. An internal flange or rib portion D′ of the member D forms a stationary lower end wall for the chamber $A^3$. The rib D′ fits loosely about the sleeve C′, thereby providing a leaky joint between the rib D′ and sleeve C′ for fluid flow into and out of the chamber $A^3$.

As shown the valve seat B is formed on a valve seat member B′ comprising an uprising sleeve portion formed with ports $B^2$, and terminating at its upper end in flange or head portion $B^3$ fitting snugly about, and forming a guide for the sleeve C′. The valve seat member B′ is also formed with a lower spider portion including a cylinder bearing $B^4$ for a central stem portion $C^5$ at the under side of the valve member C.

As shown the cylinder member D extends through an opening $A^4$ in the valve body A and is provided with an outwardly extending flange $D^2$ seating against the portion of the valve body surrounding the opening $A^4$. The piston and valve member parts C, C′ and $C^2$ form the movable lower or piston wall of a piston chamber $A^5$, the side wall of which is formed by the member D. The upper end of the chamber $A^5$ is closed by a casing member E seated on the flange $D^2$ and secured to the valve body A.

As is plainly shown in Fig. 1, the member E is in effect a cup shaped member, but has its bottom wall shaped to provide a narrow upwardly extending chamber E′. The latter has closed top and side walls but is open at its lower edge to the piston chamber $A^5$. The chamber E′ accommodates a portion of the valve operating mechanism as hereinafter described. The chamber space $E^2$ in the member E above its bottom wall, forms the lower portion of a float chamber, the main upper portion of which is enclosed and defined by a casing element F of inverted cup shape secured at its lower end to the upper end of the member E. The float chamber is in free communication at its lower end with the inlet chamber A' of the valve A and thereby is in communication with the heater or other chamber discharging through the valve A, below the overflow level in the last mentioned chamber. As shown the float chamber and inlet chamber A' are thus in communication through an external pipe connection G. At its upper end the casing member F is formed with a threaded opening F' for a vapor pressure equalizing pipe connection leading from the top of the float chamber to the vapor space of the chamber from which liquid is discharged through the valve A.

Mounted in the float chamber is a float H having a depending stem portion H' pivotally connected to an arm I' secured to a rock shaft I. The latter extends through and is journalled in the side walls of the chamber E'. A lever arm $I^2$ secured to the shaft I within the chamber E' is pivotally connected to the upper end of, and actuates a depending valve rod $I^3$. The lower end of the latter is loosely received in a guide socket $C^6$ provided at the upper side of the valve member C. Rising and falling movements of the rod $I^3$ relative to the valve member and piston member C, C', $C^2$ gives opening and closing movements to a pilot valve J controlling a port $C^7$ which extends through the valve member C, and, when open, connects the chamber $A^5$ with the valve outlet chamber $A^2$.

In the preferred construction shown, the pilot valve member J has a body portion slidingly received in a hollow boss or bearing portion $C^8$ formed on the inner wall of the sleeve C, and is pivotally connected by pin J' to a valve lever $J^2$ having a rounded fulcrum end portion received in a fulcrum bearing pocket $C^9$ formed in the inner wall of the sleeve member C'. The opposite end of the lever $J^2$ is operatively connected to the valve rod $I^3$. As shown the end of the lever $J^2$ extends between upper and lower transverse bearing pins $I^4$, which are anchored at their ends in the side walls of a slot formed in the member $I^3$.

A restricted flow of liquid into the chamber $A^5$ is provided so that when the pilot valve J closes the port $C^7$ the chamber $A^5$ fills with liquid under the pressure existing in the valve inlet chamber A'. Such liquid pressure in the chamber $A^5$ holds the valve member C against the seat B, since the underside of the valve member is subjected to the lesser pressure prevailing in the outlet chamber $A^2$. As shown the restricted inflow of liquid into the chamber $A^5$ is through a port $E^3$ formed in the top wall of the chamber E', and opening at its upper end into the lower portion of the float chamber. The rate of inflow into the chamber $A^5$ through the port $E^3$, plus any leakage into the chamber $A^5$ from the piston chamber $A^3$, should be appreciably less than the outflow through the port $C^7$, when the latter is fully open, but should be large enough to insure a sufficiently rapid closing movement of the valve member C when the port $C^7$ is closed. As shown the effective flow capacity of the port $E^3$ may be regulated by a valve member $E^4$ extending laterally into the port $E^3$ and having a threaded body portion screwed into a threaded passage $E^5$ formed in the side wall of the member E. The outer end of the passage $E^5$ is normally closed to prevent leakage by a bolt $E^6$ threaded into the outer end of the passage.

In the normal intended operation of the apparatus, on a rise in water level in the float chamber, corresponding to a rise in water level in the heater or other chamber which should then discharge liquid through the valve A, the float H is raised and thereby lifts the valve rod $I^3$ and moves the pilot valve J to open the port $C^7$. This reduces the pressure in the chamber $A^5$ until its action on the valve and piston parts C, C', and $C^2$, and the weight of said parts is less than the valve opening force exerted on the under side of the piston flange $C^2$ by the pressure in the chamber $A^3$, whereupon the valve member C starts to open. The opening movement thus initiated may continue until the valve member C reaches its wide open position, or may terminate sooner depending on water level conditions in the float chamber. If the water level in the float chamber is below that required for its movement into its wide open position, the valve member C will have its motion arrested in some intermediate position in which the float holds the pilot valve J in position to close the port $C^7$. If the water level in the float chamber then remains stationary, the pressure in the chamber $A^5$ will build up until it effects a slight closing movement of the valve member C. That movement reopens the port $C^7$ and thereby checks said closing movement. Unless conditions are such as to produce chattering, the apparatus will then be in equilibrium, with the parts in such relative positions that water will enter the chamber $A^5$ through the port $E^3$, and by leakage, at the same rate as it escapes from the chamber through the port $C^7$. If after the valve C has thus attained an intermediate position of equilibrium, the water level in the float chamber rises or falls, the valve member C will correspondingly rise or fall. If the initial rise in the water level is continuous and sufficiently great, the valve C will move continuously, unless chattering develops, from its closed position into its wide open position.

An important operating advantage of the valve mechanism disclosed arises from the leverage with which the float acts on the pilot valve J. The lever $J^2$ is a lever of the second class and advantageously has its power arm much longer than its work arm so that the force available to move the pilot valve is several times as great as the force transmitted by the valve rod $I^3$. This makes it possible to obtain the requisite pilot valve operating force without unduly increasing the size of the float and float chamber. This multiplication of the float force is obtained, moreover, without a corresponding increase in the total extent of float movement required to move the valve member C between its fully closed and wide open positions, for with the pilot valve J closed, the level of the float H relative to that of the valve member C is the same when the latter is wide open as when fully closed or in any intermediate position. This results from the fact that the fulcrum bearing for the pilot valve lever $J^2$ is fixed with respect to and moved with the main valve member C so that the movements of the pilot valve produce corresponding or following movements of the main valve member C. When the pilot valve J is full open the ends of the pivot pin J' engage ear portions C'' of the part C', so that the lifting force of the float H then assists in opening the main valve. When the valve J is fully closed while the main valve is open, all or part of the weight of the float H may be available to assist in closing the main valve.

In respect to its general operating principles which have been hereinbefore described in detail, the valve mechanism disclosed herein does not differ from that disclosed and claimed in our prior application Serial No. 482,928, filed September 19, 1930. The valve features disclosed in common herein and in said prior application give excellent results when the liquid handled is cold, but may permit objectionable valve chatter when the liquid handled is hot.

Such chatter is due, we believe, to the evaporation or "flashing" into steam or vapor of a portion of the liquid within one or both of the piston chambers $A^3$ and $A^5$. Thus when the pilot valve J is opened and the pressure in the chamber $A^5$ is reduced, the greater pressure then prevailing in the chamber $A^3$ acting on the under side of the piston flange $C^2$ initiates an upward movement of said piston flange and the main valve, opening the latter. Such upward movement of flange $C^2$ if rapid enough may result in a significant reduction in the pressure in the chamber $A^3$. If the liquid in that chamber were cold, the pressure reduction in the chamber $A^3$ would produce rising movement of the piston flange $C^2$ only because of, and in direct proportion to, the resultant inflow of liquid into the chamber $A^3$ from the chamber $A'$. With sufficiently hot liquid in the chamber $A^3$, however, but little reduction of the fluid pressure in the chamber $A^3$ is required for the flashing of a portion of the liquid into steam which acts on the piston flange $C^2$ to lift the latter above the surface of the liquid in the chamber $A^3$. The resultant opening movement of the valve member C is greater in extent and more rapid than it would be if produced solely by the inflow of liquid into the chamber $A^3$ from the chamber $A'$.

When the valve member C is given a rapid opening movement by flash steam in the chamber $A^3$, the port $C^7$ is moved into position to be closed by the pilot valve J sooner than it otherwise would. When the port $C^7$ is thus closed, the pressure in the chamber $A^5$ tends to build up more rapidly as a result of the flashing action occurring in that chamber, than it would if the pressure increase were due simply to the relatively slow inflow of liquid through the passage $E^3$. In consequence, the closing movement of the valve member C resulting from the closure of the port $C^7$ tends to be more rapid than it would otherwise be. As a result of such above described rapid opening and closing valve movements, an entirely normal condition of operation in which the liquid level in the float chamber rises steadily may not produce a similar steady opening movement of the main valve, but may produce a series of alternate opening and closing movements so rapidly repeated as to constitute objectionable valve chatter.

In accordance with the present invention such valve chatter is eliminated or substantially diminished by combining with such fluid pressure valve operating mechanism as has been described, provisions for obtaining the characteristic retarding effect on the valve movement in either direction of a liquid filled dashpot which contracts in proportion to the valve movement. In the form shown in the drawing, the said provisions comprise a circumferential rib $C^{10}$ on the sleeve $C'$ which nearly closes the annular space between the cylinder D and sleeve $C'$ and forms the movable lower wall of a dash pot chamber $A^6$ extending vertically between the rib $C^{10}$ and the rib $D'$. The flange $C^{10}$ unites with the cylinder D to provide a restricted flow passage between the inlet chamber $A'$ and the dashpot chamber $A^6$. The restricted flow passage thus provided between the chambers $A'$ and $A^6$, may readily be so proportioned as to permit and insure the desired flow through the restricted flow passage between the chambers $A^6$ and $A^3$, as well as to insure the desired dashpot action of the chamber $A^6$.

With the described dashpot provisions, rapid valve opening movements, such as "flash" steam in the chamber $A^3$ tends to produce, is prevented by the fact that such movement results in contracting the liquid filled dashpot chamber $A^6$. Owing to the dashpot action of the chamber $A^6$, the pressure in the chamber $A^3$ is kept above the flash pressure provided water can pass into the chamber $A^3$ as rapidly as the volume of that chamber is increased. With the chamber $A^3$ kept filled with liquid, that chamber exerts the dashpot action and prevents such rapid valve closing movement as "flash" steam in the chamber $A^5$ would otherwise produce. In consequence of the dashpot prevention of unduly rapid valve movements, the constant tendency to flow of liquid from the chamber $A'$ into the chambers $A^3$ and $A^6$ keeps the last mentioned chambers substantially filled with liquid and prevents any significant flash steam generation in those chambers.

In addition to the above mentioned advantages, the apparatus valve disclosed herein possesses certain other advantages of practical importance over the apparatus of our prior application. For one thing, the equalizing connection G between the inlet chamber $A'$ and the float chamber simplifies the construction and facilitates the assemblage of the control valve mechanism. The provision for a restricted flow of fluid into the chamber $A^5$ from the float chamber through the wall between them also simplifies the construction. As will be readily apparent the passage $E^3$ and the intersecting passage $E^5$ for the adjusting device $E^4$ may be readily formed by simple machining operations. The connection of the float H to the pilot valve through the rock shaft I provides suitable guidance for the float and for the upper end of the valve rod $I^3$ with a minimum of frictional resistance and wear. As will be understood, the bearings in the side wall of the chamber $E'$ for the shaft I need not be absolutely liquid-tight since leakage through those bearings may be compensated for by the adjustment of the valve or adjusting device $E^4$.

The use of the rock shaft I also permits the use of simple and effective means for manual operation of the rock shaft I when required or desirable for valve test or other purposes. As shown such manual adjustment of the shaft I may be effected through a shaft K in line with the shaft I, and journalled in the side wall of the chamber $E^2$. The shaft K is provided at its outer end with a crank arm $K'$, and at its inner end with a clutch member $K^2$ which cooperates with a clutch member $I^{40}$ secured to the shaft I. The clutch member $I^{40}$ may advantageously be formed by a suitably shaped portion of the hub of the crank arm $I'$. Advantageously, the clutch parts $K^2$ and $I^{40}$ are so shaped that the shaft K may be normally stationary in a position in which the oscillatory movements of the rock shaft I do not bring the clutch parts into operative engagement. This result is obtained as shown in the drawing by providing the clutch members I⁴⁰ and K² with axially overlapping portions which collectively extend sufficiently less than 360° about the common axis of the shafts I and K to permit the described relative angular movements of those shafts. As shown a stuffing box K³ is provided to prevent leakage along the shaft K. With the arrangement described the frictional resistance of the stuffing box to the angular movement of the shaft K does not impede or interfere with the normal oscillatory movements given to the shaft I by the float H.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention what we claim as new and desire to secure by Letters Patent, is:

1. The combination in a float actuated valve for controlling the flow of hot liquid and comprising a valve casing having an inlet, an outlet and a connecting port, of a valve member controlling said port, a float rising and falling in accordance with a variation in the amount of the controlled liquid accumulating at one side of said port, a pilot valve connected to said float and given movements by the float corresponding to the movements of the latter, fluid pressure means within said casing and controlled by said pilot valve and actuated by the said liquid passing through said casing for giving said member movements in general correspondence with the movements of said float and means retarding the movement of said member in each direction comprising two piston chambers each normally filled with liquid and having a restricted outlet for such liquid and one or the other of which, depending on the direction of movement of said member, is contracted in volume by and in proportion to the last mentioned movement.

2. The combination in a valve comprising inlet and outlet chambers and a connecting port, of a cup shaped piston and valve structure forming the movable lower wall of a piston chamber, the bottom portion of said structure constituting a valve member controlling said port, said structure having an outwardly extending flange at its rim and a second outwardly extending flange below said flange, a stationary cylinder surrounding said flanges and formed with an internal flange extending between the first mentioned flanges, whereby said flanges form the end walls of two end to end piston chambers in restricted communication with said inlet chamber, means providing for a restricted flow from said inlet chamber into its first mentioned piston chamber tending to equalize the pressures in the last mentioned chambers, and a pilot valve controlling communication between the first mentioned piston chamber and said outlet chamber.

3. In combination a casing structure having valve inlet and outlet chambers, a port connecting said chambers, a piston chamber above said port and in restricted communication with said inlet chamber, a float chamber above said piston chamber and a wall between said float and piston chambers shaped to form a crank chamber having vertically disposed side walls and a top wall but open at its underside to said piston chamber, a piston and valve structure controlling said port and forming a piston element working in said piston chamber, a pilot valve controlling communication between said piston and outlet chambers, a rock shaft extending through said crank chamber and journalled in the walls thereof, a crank arm in said float chamber secured to said rock shaft, a float connected to said crank arm, a second crank secured to said shaft and located within said crank chamber and an operating connection between the last mentioned arm and said pilot valve.

4. In combination a casing structure having valve inlet and outlet chambers, a port connecting said chambers, a piston chamber above said port and in restricted communication with said inlet chamber, a float chamber above said piston chamber and a wall between said float and piston chambers shaped to form a crank chamber having vertically disposed side walls and a top wall but open at its underside to said piston chamber, a piston and valve structure controlling said port and forming a piston element working in said piston chamber, a pilot valve controlling communication between said piston and outlet chambers, a rock shaft extending through said crank chamber and journalled in the walls thereof, a crank arm in said float chamber secured to said rock shaft, a float connected to said crank arm, a second crank secured to said shaft and located within said crank chamber and an operating connection between the last mentioned arm and said pilot valve, a second shaft in alignment with the first shaft extending through the outer wall of said casing structure and a clutch connection between said shafts whereby the normal movements of the first mentioned shaft can occur without corresponding movements of the second shaft but permitting actuation of the first mentioned shaft through said second shaft.

5. In a valve of the kind described, the combination with a main valve casing comprising inlet and outlet chambers and a connecting port, of a main valve member controlling said port, and fluid pressure operating means for said main valve member including controlling means comprising a float chamber above said valve, a horizontal rock shaft having two side by side arms, a float, a vertically disposed rod having its upper end connected to said float and having its lower end connected to one of said arms and a pilot valve and operating means for said pilot valve including a vertically disposed actuating member having its upper end connected to the second of said arms and having its lower end operatively connected to said pilot valve.

VICTOR A. ROHLIN.
FRANKLIN M. PATTERSON.